Dec. 7, 1965 W. MEYER 3,221,493
EXHAUST GAS SYSTEM FOR INTERNAL COMBUSTION ENGINES
Filed April 21, 1964 2 Sheets-Sheet 1

Inventor:
Wilhelm Meyer

Dec. 7, 1965  W. MEYER  3,221,493
EXHAUST GAS SYSTEM FOR INTERNAL COMBUSTION ENGINES
Filed April 21, 1964  2 Sheets-Sheet 2
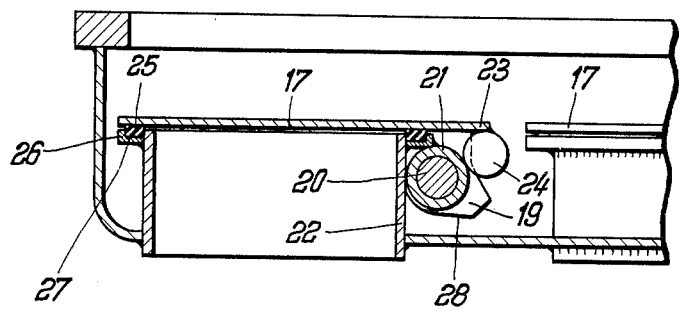
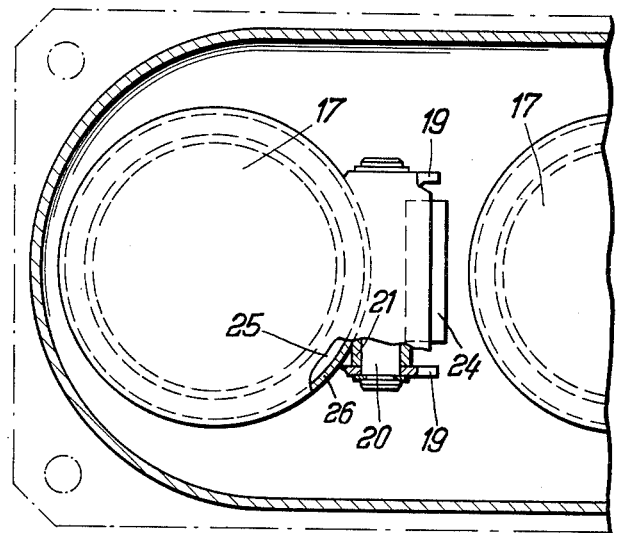
Inventor:
Wilhelm Meyer 3,221,493
EXHAUST GAS SYSTEM FOR INTERNAL
COMBUSTION ENGINES
Wilhelm Meyer, Angerstrasse 11, Hannover, Germany
Filed Apr. 21, 1964, Ser. No. 361,417
Claims priority, application Germany, Apr. 24, 1963,
B 71,612
3 Claims. (Cl. 60—30)

The present invention relates to an exhaust gas system for internal combustion engines.

The purpose of exhaust gas systems for internal combustion engines is to discharge the exhaust gases of for example, vehicle, marine or like engines to the outside. Exhaust gas systems usually comprise exhaust pipes connected to a plurality of engine cylinders and silencing devices of conventional construction.

In some types of internal combustion engines the available space is extremely restricted and this space is also required for the accommodation of auxiliary equipment, such as of fuel tanks, pumps, gear boxes and so forth. Such engines may also be used under water in which case the engine must be contained in a completely sealed compartment.

In such forms of construction the temperatures inside the closed compartment would normally be raised to impermissibly high levels by the heat emerging from the engine and, in submerged operation of the engine, water could enter the exhaust gas system and thus find its way into the cylinders.

It is, therefore, one object of the present invention to provide an exhaust gas system for internal combustion engines, wherein suitable arrangements are made for adequately ventilating the interior of the engine compartment and hence for the maintenance of permissible temperature levels and to prevent the entry of water into the exhaust gas system.

It is another object of the present invention to provide an exhaust gas system for internal combustion engines, wherein ejection pumps are incorporated in the exhaust gas system, utilising the energy of the exhaust gas to extract hot air from the closed engine compartment. Cold fresh air may then be arranged to enter the engine compartment through suitable ventilation means for underwater operation. In order to prevent exhaust gases from the engine from being drawn back into the engine compartment, self-acting non-return valves (preferably flap valves) are provided in the air intakes of the ejector pumps, these valves sealing the exhaust gas pipes from the engine compartment, when the static back pressure in the air intake rises, and opening under the effect of the vacuum head generated by the ejector pumps.

It is still another object of the present invention to provide an exhaust gas system for internal combustion engines, wherein the end of the exhaust gas pipe may be protected by a self-acting float valve, which hermetically seals the end of the exhaust gas pipe when the engine is stopped, for preventing the entry of water into the system when the engine is submerged.

It is also an object of the present invention to provide an exhaust gas system for internal combustion engines, wherein the ejector pumps, the non-return flap valves in their air intakes and the water locks associated with one or more silencers intervening between the ejector pumps and the water locks form a structural unit.

With these and other objects in view which will become apparent in the following detailed description, the present invention will be clearly understood in connection with the accompanying drawings, in which:

FIG. 2 is a section, in greater detail, of the non-return flap valve in the air intake of the ejector pump; and FIG. 3 is a top plan view thereof.

Figure 1:
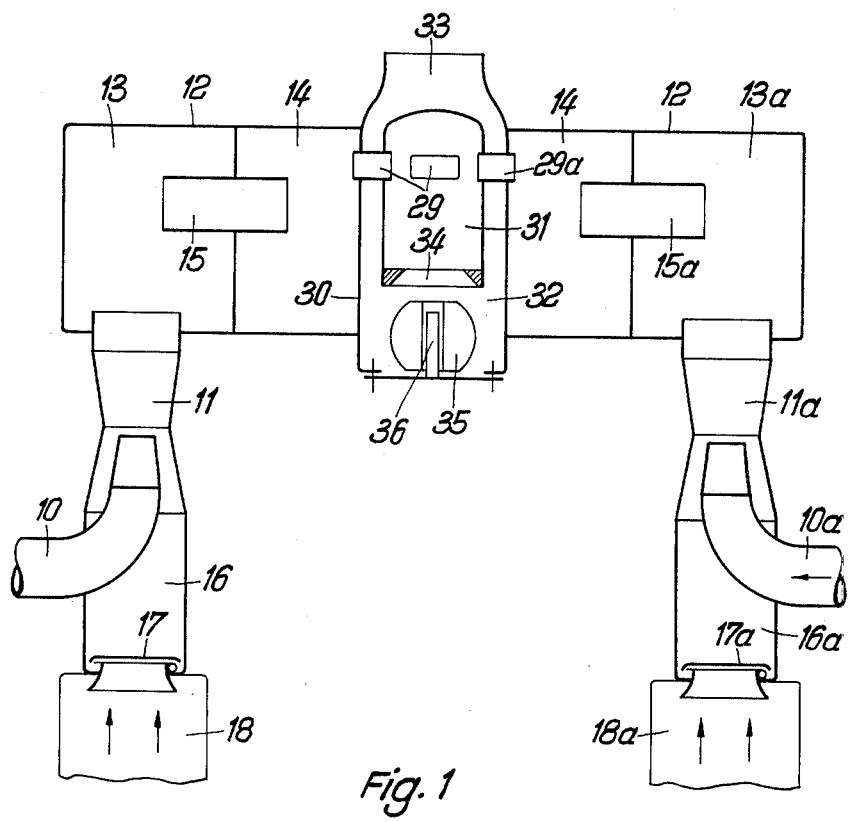
FIGURE 1 is an elevation of a silencer with ejector pumps, non-return flap valves and water locks.

Referring now to the drawings, the embodiment disclosed therein amounts to an application of the arrangement to a V-type engine which is equipped with two separate exhaust gas pipes.

Referring now to FIG. 1, each of the exhaust gas pipes 10 and 10a discharge into a venturi duct 11 and 11a, respectively, each forming an ejector pump delivering into a silencer 12. The latter comprises two chambers 13 and 13a, each communicating through a pipe 15 and 15a, respectively, with a common chamber 14. However, it will be understood that the silencer 12 may be of any desired construction.

Owing to the suction effect of the exhaust gases flowing through the pipes 10 and 10a the ejector pumps 11 and 11a draw in air through the air intake pipes 16 and 16a, respectively, which communicate through non-return flap valves 17 and 17a, respectively, for example, with the interior of the engine compartment (not shown).

Referring now again to the drawings, and in particular to FIGS. 2 and 3, a non-return flap valve 17 is illustrated in greater detail. The flap of the valve 17 consists of a sheet metal stamping formed with two lateral lugs 19 connected by a hinge pin 20 which works in a sleeve 21 attached to the air intake pipe 22. A short lever arm 23 at the rear end of the flap 17 carries a counterweight 24 which is arranged nearly to balance the weight of the flap 17. The latter, therefore, bears only lightly on its seating. When closed, the flap 17 rests on a sealing ring 25 inserted into an annular groove 27 formed at the upper end of the intake pipe by a channel-section flange 26. The two lugs 19 are so shaped that they also limit the deflection of the flap in open position, edges 28 of the lugs in this position bearing against the outside of the intake pipe 22. As will be understood by reference to FIGS. 2 and 3, several non-return flap valves 17 may be provided side by side.

The silencer 12 communicates through gas pipes 29 and 29a respectively, with a water lock 30, which may be located, for instance, between the two symmetrically disposed halves of the exhaust system. The water lock 30 comprises an inner chamber 31 and an outer chamber 32 which encloses the chamber 31 and which at its upper end 33 discharges to the outside either directly or through further extension pipe means (not shown). The inner chamber 31, which communicates with the silencer 12 extends approximately half way down the outer chamber 32 and has an opening 34 which can be closed by a float 35 or some other suitable valve element of alternative construction, so arranged that water entering the chamber 32 can lift the valve element or float 35 on or in appropriate guide means 36 into sealing contact with the edge of the opening 34.

The manner in which this arrangement functions will be readily understood from the above description. If water enters the chamber 32 causing the float 35 to close the opening 34, the exhaust gases can enter the chamber 32 and escape to the outside only by pushing back the float 35 into the chamber 32 after building up appropriately increased pressure. On the other hand, the non-return flap valves 17 and 17a, respectively, prevent the increased back pressure of the exhaust gases from forcing the latter into the engine compartment.

Naturally the arrangement proposed by the present invention is not restricted to the described embodiment comprising two exhaust pipes 10 and 10a. It can just readily be incorporated in a single pipe exhaust system. Moreover, several water locks 30 may be provided, in series, if desired.

While I have disclosed one embodiment of the present invention, it is to be understood that this embodiment is given by example only and not in a limiting sense, the scope of the present invention being determined by the objects and the claims.

What we claim is:

1. An exhaust gas system for internal combustion engines, comprising
   at least one ejector pump,
   an air intake pipe communicating with said ejector pump,
   a non-return valve disposed in said air intake pipe, and said non-return valve automatically opening and closing, respectively, in response to the pressure prevailing in said air intake pipe,
   said non-return valve comprising a flap valve including a flap and closing by gravity, and includes
   a counterweight substantially compensating for the weight of said flap valve,
   said flap valve comprising a sheet metal pressing having two lateral lugs forming a hinge, said lugs simultaneously limiting the deflection angle of said flap,
   said flap having a lever arm projecting between said lugs,
   a counterweight attached to said lever arm and disposed beyond the axis of said hinge,
   said air intake pipe having a seating at its top edge,
   a sealing ring mounted in said seating,
   said non-return valve bearing on said seating,
   said air intake pipe having a channel section flange to form a groove, the latter receiving said sealing ring and constituting said seating, and
   a silencer means following directly and communicating with said ejector pump.

2. The system, as set forth in claim 1, which includes at least one waterlock means disposed on the outlet side of and communicating with said silencer means.

3. The system, as set forth in claim 2, wherein
   said waterlock means comprises an outer chamber and an inner chamber,
   said outer chamber communicates at its top with the atmosphere,
   said inner chamber communicates at its top with said silencer,
   said outer chamber defining an opening with said inner chamber, and
   a valve element disposed between and separating said outer chamber from said inner chamber, so that upon raising the water level in said outer chamber, said valve element assumes sealing contact with said opening between said chambers.

References Cited by the Examiner

UNITED STATES PATENTS

| | | |
|---|---|---|
| 806,083 | 11/1905 | Gowing. |
| 1,025,251 | 5/1912 | Desmond. |
| 1,156,447 | 10/1915 | Underwood _____ 60—30 X |
| 1,641,394 | 9/1927 | Martin. |
| 2,376,326 | 5/1945 | Boyles et al. |
| 2,408,166 | 9/1946 | Hawkins _____ 137—63 X |
| 2,637,264 | 5/1953 | Harmon _____ 137—527.8 X |

FOREIGN PATENTS

| | | |
|---|---|---|
| 34,509 | 1/1935 | Netherlands. |

EDGAR W. GEOGHEGAN, *Examiner.*

SAMUEL LEVINE, *Primary Examiner.*